US006841725B2

(12) United States Patent
Fortuna

(10) Patent No.: US 6,841,725 B2
(45) Date of Patent: Jan. 11, 2005

(54) MEASURE MINDER

(76) Inventor: David F. Fortuna, 107 Carroll St., Shreveport, LA (US) 71105

( * ) Notice: Subject to any disclaimer, the term of this patent is extended or adjusted under 35 U.S.C. 154(b) by 21 days.

(21) Appl. No.: 10/609,439

(22) Filed: Jul. 1, 2003

(65) Prior Publication Data

US 2004/0031376 A1 Feb. 19, 2004

Related U.S. Application Data

(60) Provisional application No. 60/402,711, filed on Aug. 13, 2002.

(51) Int. Cl.[7] .............................................. G09B 15/02
(52) U.S. Cl. ..................................... 84/477 R; 84/484
(58) Field of Search .......................... 84/470 R, 477 R, 84/478, 479, 479 A, DIG. 6, 453, 454, 604–612, 615, 634–636, 649–653

(56) References Cited

U.S. PATENT DOCUMENTS 4,193,257 A * 3/1980 Watkins ....................... 84/484
4,380,185 A * 4/1983 Holcomb ...................... 84/714
4,733,593 A * 3/1988 Rothbart ...................... 84/484
5,214,228 A 5/1993 Hoiles et al.
5,275,082 A 1/1994 Kestner-Clifton et al.
5,447,089 A 9/1995 Marrash
5,850,048 A 12/1998 Ruf

* cited by examiner

Primary Examiner—Kimberly Lockett
(74) Attorney, Agent, or Firm—Richard C. Litman

(57) ABSTRACT

A "Measure Minder" device has two display housing parts connected together so that the first display face is viewable to the instructor and the second display face is viewable to the students. The display face includes a first digital display for indicating to the conductor/instructor the measure count of the composition being played. A first blinking display is also provided, indicating to the conductor/instructor the selected number of beats per measure at the selected tempo. A keypad on the first display face allows the conductor/instructor to select the tempo, number of beats per measure, measure count, start or stop the displays, and turn power on and off.

20 Claims, 4 Drawing Sheets

MEASURE MINDER

CROSS-REFERENCE TO RELATED APPLICATION

This application claims the benefit of U.S. Provisional Patent Application Ser. No. 60/402,711, filed Aug. 13, 2002.

BACKGROUND OF THE INVENTION

1. Field of the Invention

The present invention relates to metronomes, and more specifically to a programmable metronome which is useful for conducting beginning music students and further useful as a practice device and/or a teaching aid for reminding beginning music students of the correct beat, tempo and measure to play in a song selection from a sheet of music.

2. Description of Related Art

A major problem associated with coordinating musicians is having the participants play a piece of music together on the same beat and measure, particularly musicians that have not acquired the ability to read music. It is not uncommon for beginning music students to lose their timing for the playing of notes and also their places on the music sheet. Measures are frequently 'counted out' by the instructor/conductor during practice in order for the student/musician to ascertain the place on the sheet of music where the instructor/conductor desires for playing to begin. However, this practice is generally considered as unacceptable when it takes place during a performance.

The use of electronic audio and video displays to assist in conducting live musicians is well known in the prior art. For example, U.S. Pat. No. 5,275,082 issued Jan. 4, 1994 to Kestner-Clifton et al. shows an electronic visual music conducting device adapted to receive electronic timing signals representative of the tempo of a piece of music and to use the timing signals to control a visual display indicates tempo and rhythm by simulating the movement of a conductor's baton. The device can include a bar display to indicate numerically which bar is currently being played and a beat display to indicate numerically the number of beats per minute associated with the bar currently being played.

U.S. Pat. No. 5,214,228 issued May 25, 1993 to Hoiles et al. teaches an electronic metronome having a selector switch, three visual indicators, and a programmable counter coupled to the selector switch and the visual indicators for providing various sequential time signature displays. A speaker is used for providing an audible beat pattern for the student/musician. The metronome of Hoiles et al. provides (1) a digital readout on a three digit, seven-segment light emitting diode display of the number of beats per minute, (2) an audible tick-tock rhythm, and (3) various visual patterns on an array of three distinctly colored light emitting diodes corresponding to available beats per measure time signatures.

U.S. Pat. No. 5,447,089 issued Sep. 5, 1995 to Marrash discloses an electronically programmable metronome having a foot switch for adjusting the tempo over a continuous range without taking hands off an instrument or interrupting playing. A micro-controller is pre-programmed with a metronome click pattern in any selected note duration value. The clicks are produced with different amplitudes and tones so as to produce distinct loud medium and soft-clicks. Headphones, an audio speaker and/or a light emitting diode indicator provide audible and visual cues of the tempo to aid the user.

In U.S. Pat. No. 5,850,048, issued Dec. 15, 1998 to Ruf, a digital read-out electronic metronome is taught which displays the correct beat per measure. The Ruf device includes a keyboard for entry of a musical signature including the number of beats per measure. A liquid crystal display visually informs a user of the correct beat of a measure. The display may be in the form of a graphical representation of a measure with visual indicia highlighting the current beat. Ruf's device is pocket-sized and battery operated.

None of the above inventions and patents, taken either singly or in combination, is seen to describe the instant invention as claimed.

SUMMARY OF THE INVENTION

The present invention provides a "Measure Minder" device that visibly and audibly displays the beats in a measure of music being played by a musician and further provides a visual numerical display of the correct measure being played. The device is useful for the purpose of reminding beginning music students of the place to begin as well as maintain playing a selection of music on a sheet of music. In addition, the present invention provides a means for aiding conduction of beginning music students in that the student is visually reminded of the beat, tempo and measure for a selection of music on a sheet of music.

Two display housings are flexibly connected together by one or more plastic hinges such that when the Measure Minder is placed on a conductor's stand, the display of the first housing is viewable to the conductor/instructor and the display of the second display housing is viewable to the musician/music student facing the conductor/instructor. The housing of the Measure Minder holds the metronome electronics and/or batteries to power the Measure Minder.

The metronome electronics cooperates with a keypad on one of the display faces of the Measure Minder housing to start and stop the Measure Minder displays, to adjustably select the display tempo for the beats of each measure, to adjustably select the number of beats per measure, and to adjustably select which measure will be indicated on the displays to instruct the students as to the location on the music sheet that the instructor wants the student to begin playing. For music pieces written with changes in tempo and/or beats per measure, the conductor has the ability to program in those requirements as needed using the keypad. After programming, pressing the start button causes the Measure Minder to proceed through the piece making changes in tempo and/or beats per measure at the programmed points in the music piece.

The Measure Minder housing consists of two display housing parts electrically and mechanically connected together so that the display face of the first display housing is viewable to the instructor and the display face of the second display housing is viewable to the students. The display face of first display housing includes a first liquid crystal display (LCD) (or, if desired, a light emitting diode or LED display) for indicating to the conductor/instructor the measure count of the music being played, a first blinking light display in the shape of a minus sign formed of an LCD segment which indicates to the conductor/instructor the selected number of beats per measure at the selected tempo, and/or a speaker to audibly indicate to the conductor/instructor the number of beats per measure at the selected tempo.

The keypad is provided on the display face of the first display housing. The keypad allows the conductor/instructor to select the tempo, select the number of beats per measure, select the beginning measure count, select the start or stop the displays, program changes in tempo and/or beats per measure, and to turn the Measure Minder power on and off. The switches of the keypad may be provided on a display membrane having a clear window for viewing the LCD displays on the display face of the first display housing.

When an audio beat is desired, the conductor/instructor can plug an amplifier or earphone into the audio output jack of the first display housing and the desired audible beat can be heard.

The display face of the second display housing also includes a second LCD which indicates to the musician/music student the measure count of the composition of music being played and a second blinking light display in the shape of a minus sign formed of an LCD segment to indicate to the musician/music student the selected number of beats per measure at the selected tempo to be played.

A plastic ribbon with flexible conductors or conductive traces thereon connects the displays of the second display housing with the electronic metronome circuit. VELCRO™ or other suitable fastening means are adhesively placed on the back face of the first display housing and the and the top surface of the conductor's stand to allow the Measure Minder to be removably secured to the top of the conductor's stand.

The first display housing may also be equipped with a signal transmitter to transmit the beat and measure count signals to a plurality of second display housings fitted with signal receivers, whereby the beat and measure count cam be viewed by persons at remote locations. Any type of transmitter/receiver system capable of sending and receiving the digital beat and measure count signals would be suitable for this purpose.

Accordingly, it is a principal object of the invention to provide an electronic metronome having displays for indicating to a music student and an instructor the number of beats per measure, the number of the current measure being played, and the tempo at which to play.

It is another object of the invention to provide an electronic metronome wherein the tempo, beat, and number of the measure to be played are selectable and indicated to both the students and the instructor.

It is a further object of the invention to provide a portable battery powered electronic metronome wherein the tempo, beat and the number of the measure of a music selection to be played are selectively adjustable for simultaneous display before the student and the instructor.

Still another object of the invention is to provide an electronic metronome that contains two durable plastic or metal cases or display housings wherein one display housing has a large visual display of the measure count for easy viewing by students to remind them of the location to begin and continue playing.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a metronome device operated by a music instructor to visually and audibly remind students of the number of beats per measure, tempo of the beats, and which measure on a sheet of music that will be used when beginning and continuing playing.

Figure 1:
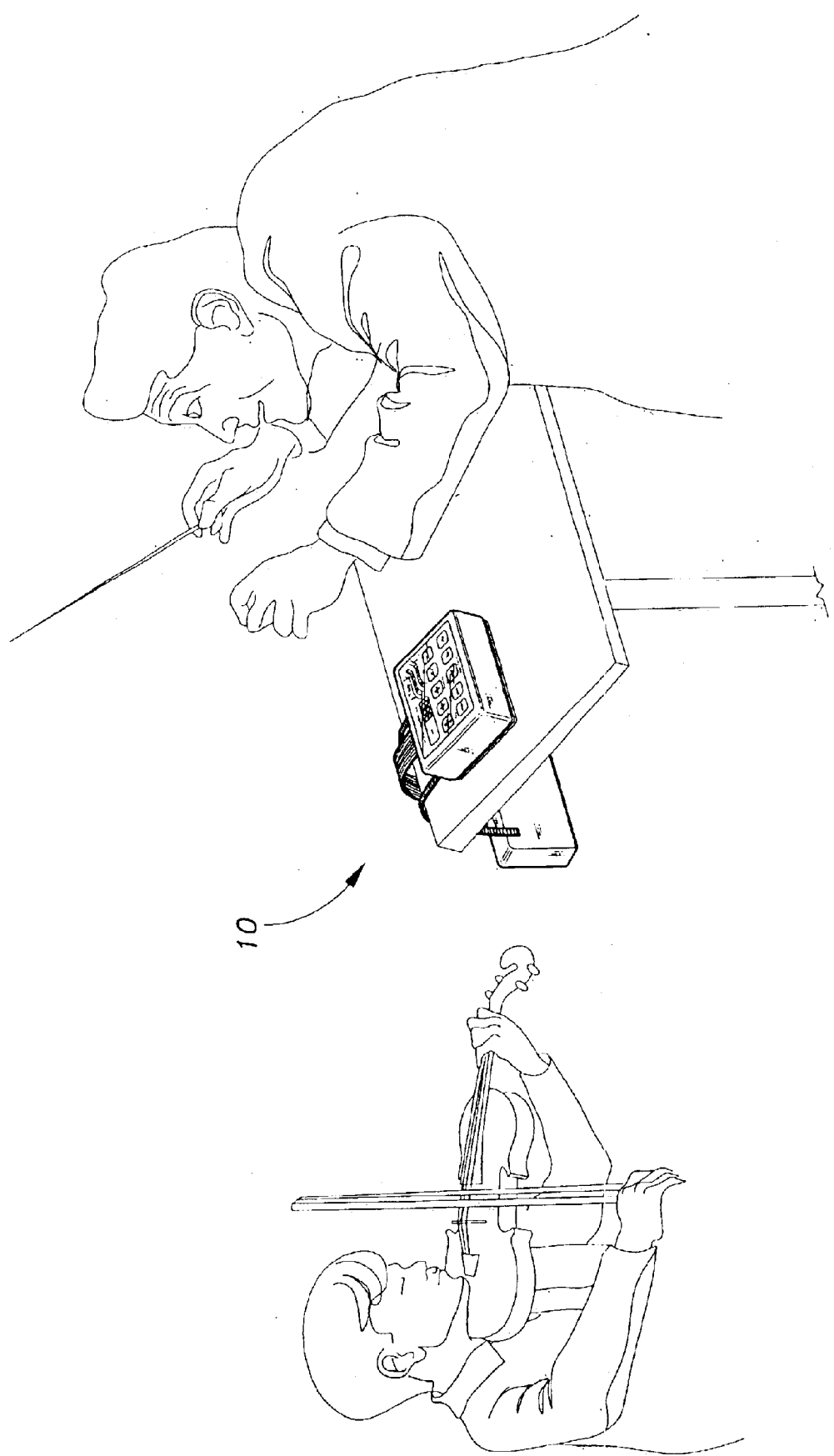
FIG. 1 is an environmental, perspective view of a measure minder metronome device as it would be in use on a conductor's stand according to the present invention.

FIG. 1 illustrates the use of the Measure Minder device 10 in the music-teaching environment on a conductor's stand. The device is placed on the stand so that separate displays are viewable to the student and the instructor.

Figure 2:
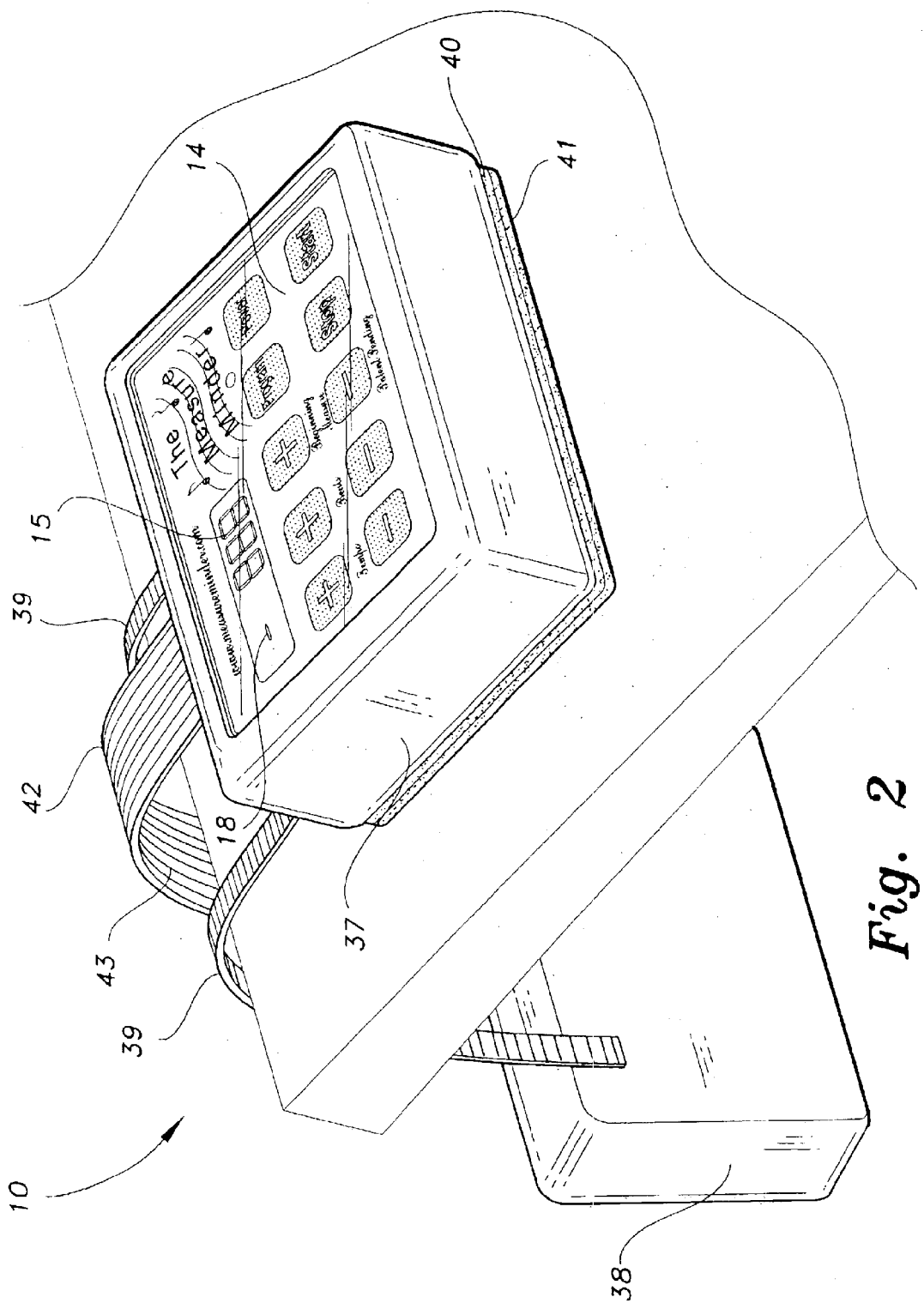
FIG. 2 is an enlarged perspective view of the measure minder metronome device showing two display housings connected by flexible hinges as would be viewed by the instructor or conductor according to the present invention.

As best seen in FIG. 2, the Measure Minder includes a first display housing 37 which has been placed on a conductor's stand or similar support apparatus so that a first digital measure count display 15, a beat light display 18, and the keys of a keypad 14 are viewable on the first display face to the music instructor. The measure count display 15 and beat light display 18 are viewed through an opening in a display membrane covering the display face of the first display housing. The keys of the keypad 14 are also formed on the flexible display membrane. Flexible plastic straps 39 are secured to a top edge of the first display housing 37 and to a top edge of a second display housing 38. Straps 39 hinge display housings 37 and 38 together, with enough space between the housings such that housing 38 freely hangs down in front of the conductor's stand and the display face of the second display housing 38 is exposed to viewing by the music students. A flexible plastic ribbon 42 having a plurality of flexible conductors or conductive traces 43 therein operatively connects the display circuitry of the second display housing 38 to the electronic metronome circuitry of the measure minder.

Also shown in FIG. 2 are adhesively backed VELCRO™ patches 40 and 41. Patch 40 is affixed to the bottom of the first display housing 37 and patch 41 is affixed to the top of the conductor's stand. Patches 40 and 41 enable the measure minder to be securely and removably attached to the conductor's stand.

An audio output jack 17 is provided on the side of the first display housing 37 so that the audible beat may be heard in earphones by the conductor or amplified by another means so that the choir/band can hear it.

Figure 3:
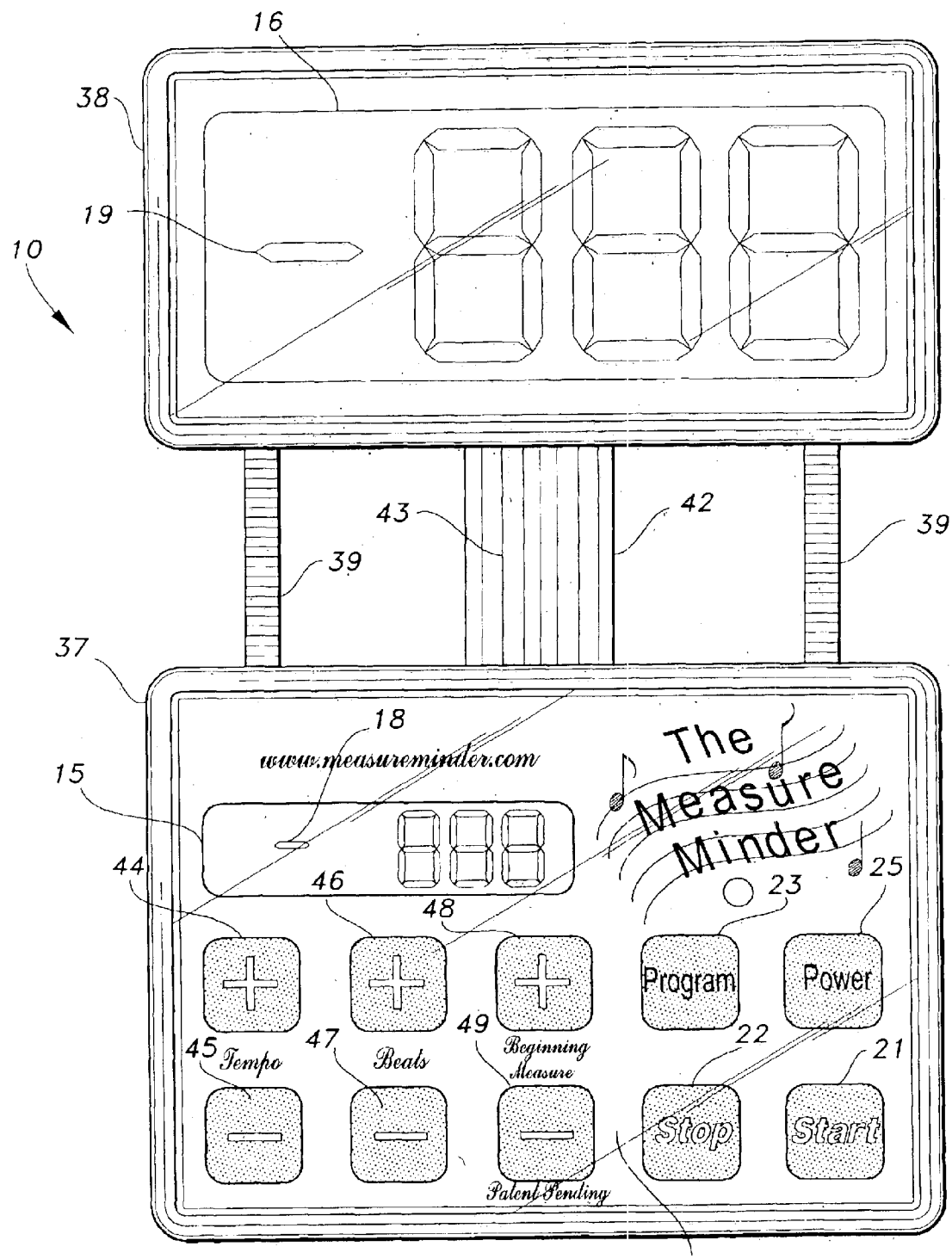
FIG. 3 is a plan view of the measure minder metronome device as would be seen with both display housings laid face up on a flat surface according to the present invention.

FIG. 3 shows in more detail the keys of the keypad 14 on the display membrane covering the display face of the first display housing 37. Keys 44 and 45 are used to selectively adjust the beat tempo. Keys 46 and 47 are used to select the number of beats per measure. Keys 48 and 49 are used to select the beginning measure. Key 25 is used to control power to the measure minder 10. Key 23 is the program button that allows the instructor/conductor to selectively program changes in tempo and/or beats per measure as required at designated places in some music pieces.

Second display housing 38 is also shown in FIG. 3. The display face of the second display housing 38 includes a beat light display 19 for providing a visual beat indication in the form of a blinking minus sign to the students. Measure count displays 15 and 16 and Beat light displays 18 and 19 are, preferably, LCD's, but could be in the form of incandescent lamps, light emitting diodes, or other suitable sources of illumination. A large, preferably two inches in height, digital measure count display 16 is also included on the display face of the second display housing for easy viewing by the students.

Figure 4:
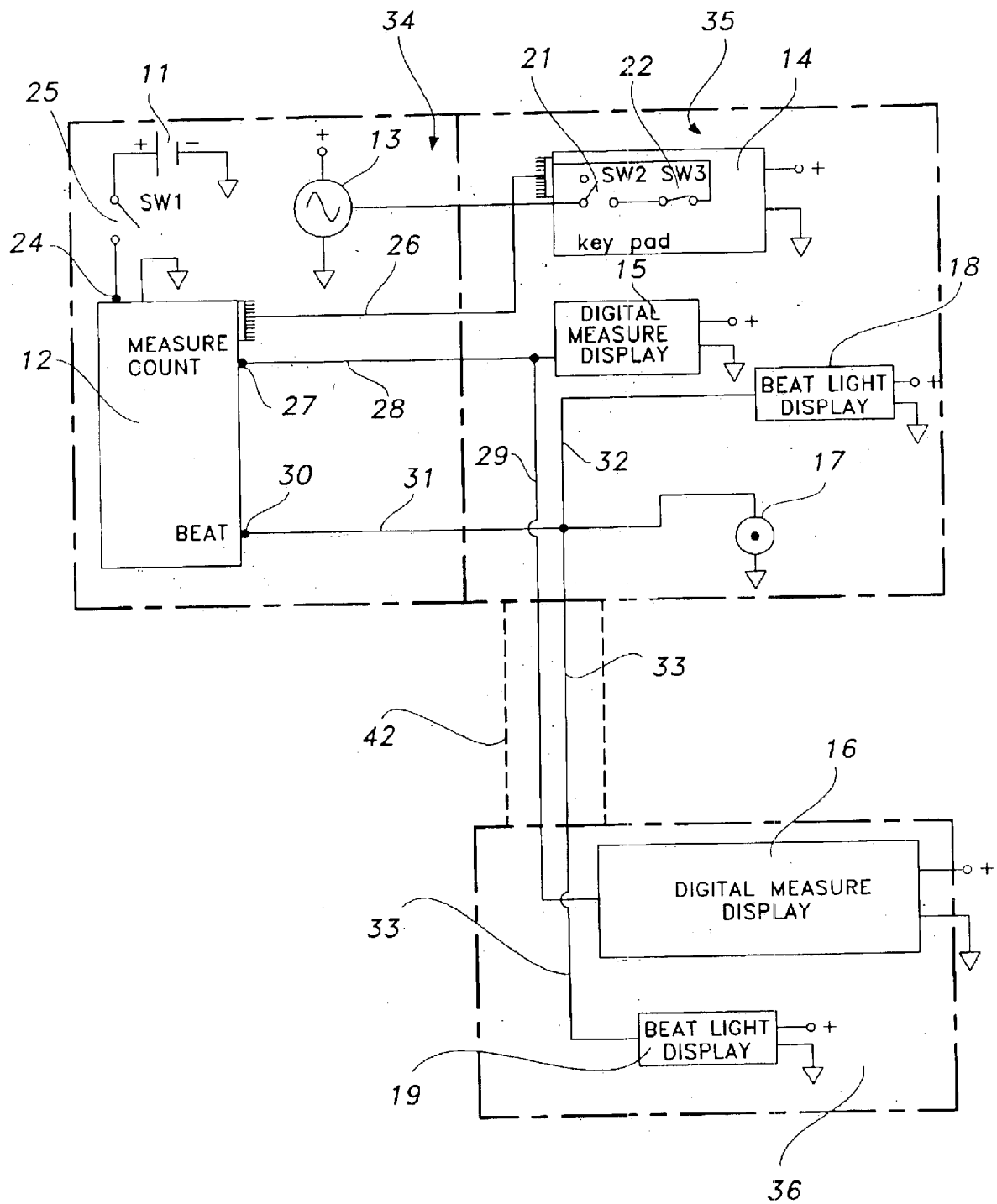
FIG. 4 is a simplified block diagram of the circuitry of the measure minder metronome device according to the present invention.

A block diagram of the circuitry forming the measure minder is shown in FIG. 4. The components of the circuitry are all well known and commercially available. A switch 25 supplies power to the circuit components from a replaceable battery 11. Power for the programmable micro-controller 12 is supplied to input 24 from the battery 11.

The micro-controller 12 also has control signal input ports provided with signals from the keypad 14 via a plurality of lines 26 (not shown). Keypad 14 includes a normally open switch 21 and a normally closed switch 22 that control activation of the measure minder. A signal from a signal generator 13 is provide at an input port of the micro-controller via switches 21 and 22. When switch 21 is closed the micro-controller produces a measure count signal at output port 27.

The measure count signal is input into the digital measure count display 15 of the first display housing 37 via line 28. The measure count signal is also input into the large digital measure count display 16 of the second display housing 38 via a line 29. The number of the measure count is thereby illuminated and shown on both measure count displays 15 and 16. A beat signal is also generated by the micro-controller and provided to an output port 30. The signal on port 30 is provided to the beat light display 18 of the first display housing 37 via lines 31 and 32, and further provided to the beat light display 19 of second display housing 38 via line 33.

Lines 29 and 33 may be provided as conductive traces on the flexible plastic ribbon 42 connected between the display housings. Audio output jack 17 is also connected to port 30 for allowing the beat to be heard by the conductor through an earphone or heard by the students through a loudspeaker.

It is to be understood that the present invention is not limited to the embodiments described above, but encompasses any and all embodiments within the scope of the following claims.

I claim:

1. A measure minder device for selectively visually displaying an indication of the measure count of musical selections being played by beginning music students, the device comprising:

a first display housing having a first display face;

a second display housing having a second display face;

a keypad mounted on said first display face of said first display housing;

said keypad having keys positioned on a display membrane covering said first display face of said first display housing so as to be accessible to an operator of the device for selectively programming the device to display the measure count for chosen musical selections;

a first digital measure count display unit mounted on said first display housing and viewable through a window in said display membrane to provide a continuous visible numeric indication of the measure count before and during playing for the chosen musical selections;

a second digital measure count display unit mounted on said second display housing to provide a continuous visible numeric indication of the measure count for the chosen musical selections, said second display unit being larger than said first display unit so as to be easily readable while facing said second digital measure count display unit; and micro-controller means mounted within one of said first and second display housings, said micro-controller means being operatively connected to the keys of the keypad and said first and second digital measure count display units for selectively controlling the measure count indications for the chosen musical selection.

2. The measure minder according to claim 1, wherein the micro-controller means includes a replaceable battery and said keypad includes a pair of keys for selectively programming said micro-controller means to provide signals to said display units of a selected measure count and a key for turning the power supplied from said battery on and off.

3. The measure minder according to claim 1, wherein said first and second display housings are moveably hinged together by a pair of flexible straps and a flexible plastic ribbon with conductors therein passes from said first display housing and into said second display housing to connect one of said first and second digital measure count displays to said micro-controller means.

4. The measure minder according to claim 1, wherein said first display housing includes attaching means for securing the device to the top surface of a music stand.

5. The measure minder according to claim 1, wherein said second display housing includes a beat indicator mounted thereon, said beat indicator being operatively coupled to said micro-controller means; and said keypad further includes a pair of keys for selectively programming said micro-controller means to provide a beat signal to said beat indicator of said second display housing indicative of the beat for the chosen musical selection.

6. The measure minder according to claim 1, wherein said first display housings includes a beat indicator mounted therein, said beat indicator being operatively coupled to said micro-controller means;

said beat indicator being viewable on the display face of said second display housing; and said keypad further includes a pair of keys for selectively programming the micro-controller to provide a beat signal to said beat indicator and/or an audio output jack on said first display housing indicative of the beat for the chosen musical selection.

7. The measure minder according to claim 6, wherein said keypad includes a pair of keys for selectively programming the micro-controller to vary the tempo of the beat indicated for the chosen musical selection.

8. A measure minder device for selectively visually displaying an indication of the measure count of musical selections being played by beginning music students, the device comprising:

a first display housing having a first display face;

a second display housing having a second display face;

a first digital measure count display unit mounted on said first display housing and viewable through a window in said display membrane to provide a continuous visible numeric indication of the measure count before and during playing of chosen musical selections;

a second digital measure count display unit mounted on said second display housing to provide a continuous visible numeric indication of the measure count for chosen musical selections, said second display unit being larger than said first display unit so as to be easily readable while facing said second digital measure count display unit;

a keypad mounted on said first display face of said first display housing, said keypad having keys positioned on a display membrane covering the first display face of the first display housing so as to be accessible to an operator of the, said keypad including a pair of keys for selectively programming the micro-controller means to provide signals to the display units of a selected measure count and a key for turning the power supplied from the battery on and off; and micro-controller means mounted within one of said first and second display housings, said micro-controller means being operatively connected to said keys of said keypad and to said first and second digital measure count display units for selectively controlling the measure count indications for chosen musical selections.

9. The measure minder according to claim 8, wherein said first and second display housings are moveably hinged together by a pair of flexible straps and a flexible plastic ribbon with conductors therein passes from said first display housing to said second display housing to connect one of said first and second digital measure count displays to the micro-controller means.

10. The measure minder according to claim 9, wherein
said second display housings includes a beat indicator mounted thereon, said beat indicator being operatively coupled to said micro-controller means; and said keypad includes a pair of keys for selectively programming said micro-controller means to provide a beat signal to said beat indicator of said second display housing indicative of the beat for the chosen musical selection.

11. The measure minder according to claim 10, wherein
said first display housings includes a beat indicator mounted therein, said beat indicator being operatively coupled to said micro-controller means;

said beat indicator being viewable on said display face of said first display housing; and said micro-controller further providing a beat signal to said beat indicator of said first display housing and/or an audio output jack on said first display housing.

12. The measure minder according to claim 11, wherein said keypad further includes a pair of keys for selectively programming said micro-controller means to vary the tempo of the beat indicated for the chosen musical selection.

13. The measure minder according to claim 10, wherein said first and second digital measure count display units include LED's and said beat lamp comprises an LED.

14. The measure minder according to claim 10, wherein said first and second digital measure count display units include LCD's and said beat lamp comprises an LCD segment.

15. A measure minder device for selectively visually displaying an indication of the measure count of musical selections being played by beginning music students, the device comprising:

a first display housing having a first display face;

a second display housing having a second display face;

a first digital measure count display unit mounted on said first display housing and viewable through a window in said display membrane to provide a continuous visible numeric indication of the measure count before and during playing of chosen musical selections;

a second digital measure count display unit mounted on said second display housing to provide a continuous visible numeric indication of the measure count for chosen musical selections, said second display unit being larger than said first display unit so as to be easily readable while facing said second digital measure count display unit;

a first beat lamp mounted within said first display housing, said first beat lamp being operatively coupled to said micro-controller means and viewable through said display face of said first display housing;

a second beat lamp, mounted within said second display housing, said second beat lamp being operatively coupled to said micro-controller means and viewable through said display face of said second display housing;

a keypad mounted on said first display face of said first display housing, said keypad having keys positioned on a display membrane covering the first display face of the first display housing so as to be accessible to an operator of the, said keypad including keys for selectively programming the micro-controller means to provide signals to the display units of a selected measure count, keys for selectively programming said micro-controller means to provide a beat signal to said first and second beat lamps indicative of the beat for the chosen musical selection, keys for selectively programming said micro-controller means to vary the tempo of the beat indicated for the chosen musical selection, a programming key for selectively programming changes in beat and tempo for any particular measure, and a key for turning the measure minder on and off; and micro-controller means mounted within one of said first and second display housings, said micro-controller means being operatively connected to said keys of said keypad and to said first and second digital measure count display units and beat lamps for selectively controlling the measure count, beat and tempo indications for chosen musical selections, said micro-controller means permitting variations in beat and tempo indications for selected measure counts required by chosen musical selections to be selectively programmed.

16. The measure minder according to claim 15, wherein said first and second display housings are moveably hinged together by a pair of flexible straps and a flexible plastic ribbon with conductors therein passes from said first display housing to said second display housing to connect one of said first and second digital measure count displays to the micro-controller means.

17. The measure minder according to claim 16, wherein said keypad further includes a key for selectively programming said micro-controller means to vary the tempo of the beat indicated for the chosen musical selection.

18. The measure minder according to claim 15, wherein said first and second digital measure count display units include LED's and said beat lamp comprises an LED.

19. The measure minder according to claim 15, wherein said first and second digital measure count display units include LCD's and said beat lamp comprises an LCD segment.

20. The measure minder according to claim 16, wherein said first display housing includes attaching means for securing the device to the top surface of a music stand.

* * * * *